(12) United States Patent
Bou-Diab et al.

(10) Patent No.: US 7,668,802 B2
(45) Date of Patent: Feb. 23, 2010

(54) METHOD AND APPLIANCE FOR XML POLICY MATCHING

(75) Inventors: Bashar Said Bou-Diab, Ottawa (CA); Paul Boone, Ottawa (CA)

(73) Assignee: Alcatel Lucent, Paris (FR)

( * ) Notice: Subject to any disclaimer, the term of this patent is extended or adjusted under 35 U.S.C. 154(b) by 309 days.

(21) Appl. No.: 11/878,981

(22) Filed: Jul. 30, 2007

(65) Prior Publication Data
US 2009/0037379 A1 Feb. 5, 2009

(51) Int. Cl.
*G06F 17/30* (2006.01)
(52) U.S. Cl. .......................... 707/2; 707/100; 715/234
(58) Field of Classification Search .................. 707/2–5, 707/100, 101, 103 R–103 Z; 715/200, 234
See application file for complete search history.

(56) References Cited

U.S. PATENT DOCUMENTS 6,728,748 B1 * 4/2004 Mangipudi et al. .......... 718/105
7,124,188 B2 * 10/2006 Mangipudi et al. .......... 709/226

OTHER PUBLICATIONS

Weidong Yang et, al., The Optimization of Complex XML Queries over XML Streams under DTD, Web-Age Information Management Workshops, Jun. 1, 2006, Seventh International Conference.
Jaehoon Kim et, al., PosFilter: An Efficient Filtering Technique of XML Documents Based on Postfix Sharing, Jul. 3, 2007, pp. 70-81, vol. 4587.
Green, Todd J. et, al., Processing XML Streams With Deterministic Automata and Stream Indexes, ACM Transactions on Database System, XP-002523212, Dec. 4, 2004, pp. 752-788, vol. 29, No. 4.
Hyunho Lee, et, al., Runtime-Efficient Approach for Multiple Continuous Filtering in XML Message Brokers, SOFSEM 2007, Lecture Notes in Computer Science; [LNCS], Jan. 20, 2007, pp. 738-749, vol. 4362.
Altinel M. et, al., Efficient Filtering of XML Documents for Selective Dissemination of Information, Proceeding of the 26th VLBD Conference, XP-002181785, Sep. 10, 2000, pp. 1-12, Cairo, Egypt.
Diao Y. et, al., Path Sharing and Predicate Evaluation for High-Performance XML Filtering, ACM Transactions on Database System,XP-002344354 Dec. 2003, pp. 467-516, vol. 28, No. 4, New York, NY.
Candan, K. S. et, al., AFilter: Adaptable XML Filtering with Prefix-Caching and Suffix Clustering, VLDB 06, XP-002523211, Sep. 12-15, 2006, ACM, Seoul, Korea.

* cited by examiner

*Primary Examiner*—Cheryl Lewis
(74) *Attorney, Agent, or Firm*—Kramer & Amado, PC (57) ABSTRACT

An XML matching engine and method are provided, where policy rules expressed using XPath/XQuery policies are matched to streaming XML documents. Two distinct data structures are used: a combined modified DFA data structure for storing simple XPath queries (no wildcards or descendents) and a modified AFilter structure for storing complex queries (with wildcards or/and descendents). As the matching engine receives XML tags from XML parser, matching is performed in both structures in parallel.

20 Claims, 5 Drawing Sheets

METHOD AND APPLIANCE FOR XML POLICY MATCHING

FIELD OF THE INVENTION

The invention is directed to the field of application-oriented networking and in particular to a method and appliance for XML policy matching.

BACKGROUND OF THE INVENTION

End-users increasingly access Web content with devices other than conventional desktop content browsers. Such devices include personal digital assistants, cellular telephones and cable television set top boxes. As these devices lack the same capabilities of browsing the Web as the conventional desktop content browser, it is necessary to adapt the Web content from one format intended for use in one type of device, to a another format suitable for rendering in another device, called "transcoding".

The transcoding process can be facilitated through the use of information about the Web content, referred to hereinafter as "meta-information". Meta-information is generally provided with the original Web content and can be used to assist the transcoding process in identifying specific portions of the Web content. Notably, meta-information can be created without any modification of the original Web content if the meta information is described separately from the Web content.

XML (Extensible Markup Language) is a versatile meta language specified by the World Wide Web Consortium (W3C), which is an international industry consortium created for developing common protocols, addressing the needs for an extensible and interoperable Web and for developing other cross-industry specifications that are based on XML. XML allows definition of new vocabularies for document or data exchange, and optimizes the ability to integrate seamlessly and quickly new information content of diverse data sources, including structured and semi-structured documents, relational databases and object repositories. XML allows users to define elements using arbitrary words and organize them in a nested structure. Since it supports flexibility for data presentations, many Electronic Document Management Systems (EDMS) have employed XML as a representative document format.

The rapid adoption of the XML data model and Web Services has triggered the commercialization of a large number of XML-aware networking devices such as XML firewalls, XML routers, and XML transformation accelerators. With the expectation that XML will constitute more than half of the network traffic, high-speed content-aware systems have gained attention for their potential to introduce network-resident application-independent application-level value add to network services features such as QoS (Quality of service), Security, Load balancing, etc.

XML specifies how to locate and process items by using an addressing syntax based on a path through the logical structure or hierarchy of a document. It enables storing of any amount of text or any data whose structure can be represented as a tree structure; the only indispensable syntactical requirement is that the text must be enclosed between a root opening tag and a corresponding closing tag (for example <message> . . . text . . . </message>). The text enclosed by the root tags may contain an arbitrary number of XML elements. The basic syntax for one element is: <message attribute="value">content</root>, where "content" is some text which may again contain XML elements.

XPath is an expression language that provides a mechanism for identifying what content of an XML document (elements and attributes) one is interested in using or retrieving. XPath models an XML document as a tree of nodes, and provides the ability to navigate around the tree through the hierarchical structure of an XML document, selecting nodes by a variety of criteria. The primary syntactic construct in XPath is the expression; an XPath expression is often referred to simply as an XPath. An expression is evaluated to yield an object, which has one of the following basic types: node-set (an unordered collection of nodes without duplicates), boolean (true or false); number (a floating-point number); and string (a sequence of UCS characters). In other words, XPath is a syntax for identifying particular sections of a document, such as an XML-formatted document.

XQuery is query language that is designed to query XML documents for any data source that can be viewed as XML data, such as relational databases or office documents, for extracting and manipulating the information. XQuery uses XPath expression syntax to address specific parts of an XML document, and uses the structure of XML intelligently for expressing queries across all these kind of data, whether physically stored in XML or viewed as XML via middleware.

Content-aware systems, such as those used for Application Oriented Networking, rely on XPath/XQuery languages to introduce application-layer rules and enforce policies on application data.

SUMMARY OF THE INVENTION

The invention is directed to the problem of enforcing (matching) application-layer policies to network traffic at high speed, or, in other words it involves a method and associated entities for matching policy rules to XML documents at high speed.

Accordingly, the invention provides a method of enforcing application-layer policies to application layer formatted documents, each policy defining a rule and an action, comprising: a) distinctly storing simple policies and complex policies applicable to the application layer formatted documents in a simple policies data structure and respectively a complex policies data structure; b) parsing a document received as streaming application layer data in a hierarchical structure, for enabling evaluation of an object in the document; c) simultaneously querying the simple and complex policies data structures to identify a policy corresponding to the object; d) discontinue the query for that object in the simple and complex policies data structures once all simple and complex policies that match the object are identified; and e) executing the actions defined by the simple and complex policies corresponding to the object.

The invention is also directed to system for enforcing application-layer policies to XML documents, each policy defining a rule and an action, comprising: a XML parser for parsing a XML document received as streaming XML data in a hierarchical structure to enable evaluation of an object in the XML document; a simple policies data structure for storing XPath queries that do not use wildcard "*" and descendent "//" expressions; a complex policies data structure for storing XPath queries that use wildcard "*" and descendent "//" expressions; means for simultaneously querying the simple and complex policies data structures to identify all policies corresponding to the object; and means for executing the actions defined by the policies corresponding to the object identified in the data structures.

BRIEF DESCRIPTION OF THE DRAWINGS

The foregoing and other objects, features and advantages of the invention will be apparent from the following more particular description of the preferred embodiments, as illustrated in the appended drawings, where:

FIG. 2a shows the StackBranch stacks before receipt of any tags, FIG. 2b shows the stacks of FIG. 2a after receipt of a set of tags <a><d><a><b> representing an XML document path, and FIG. 2c shows the stacks after receipt of a set of tags <a><d><a><b><c>;

FIG. 5a shows the stacks before receipt of any tags, FIG. 5b illustrates the after receipt of the set of tags <a><d><a>, and FIG. 2c shows the stacks after receipt of the set of tags <a><d><a><b>.

DETAILED DESCRIPTION

The invention is directed to identifying (matching) applicable application-layer policies to network traffic at high speed. A policy consists of a Rule and an Action; the action to be executed on documents that fall within the boundaries of the policy rule.

An XML matching engine is a data processing module and associated data structures used to store application-layer policies (Rule-Action) and to match streaming XML documents to the rules associated with the respective policies. The XML matching engine enforces application-layer rules relating to QoS, security, load balancing, traffic shaping, etc. to application data at high-speed. As an example, the invention involves matching policy rules expressed using XPath/XQuery policies to streaming XML documents while performing the matching of semantic policies to XML payload at wire-speed.

A brief overview of current methods and data structures that have been proposed so far with a view to provide XML matching for content-aware systems is provided next for better understanding the invention. These previous solutions typically maintain a single datapath structure (a single policy information database) to store XPath queries for matching policy data against streaming data. All these methods maintain state machines for the XPath queries that are traversed as the filtering engine receives element tags from the XML document parser.

Thus, XFilter is described by Altinel, M. et al. in "Efficient Filtering of XML Documents for Selective Dissemination of Information", Proceedings of the 26th VLDB Conference, Cairo, Egypt, 2000. The XFilter is an early attempt at using a state machine to represent XPath queries. However, since it creates a state machine for each query, this solution is not scalable for very large numbers of queries.

YFilter is described in "Path Sharing and Predicate Evaluation for High-Performance XML Filtering, ACM Transactions on Database Systems", Diao et al., Vol. 28, No. 4, December 2003, pages 467-516. The YFilter extends XFilter by merging the state machines of all queries into a single large Non-deterministic Finite Automata (NFA) structure. This provides a reduction in the structure's memory, since prefixes of overlapping queries are only stored once, and also provides an improved processing time since multiple queries are advanced through their state machines simultaneously. However, YFilter does not guarantee any performance targets due to the non-determinism introduced by the NFA that uses wildcard ("*") and descendent ("//") expressions. Using Deterministic Finite Automaton (DFA), described next, to eliminate this non-determinism by building in all possibilities is impractical because the use of wildcard ("*") and descendent ("//") expressions leads to the possibility of an exponential number of states.

Green et al. describe a DFA (Deterministic Finite Automaton) filtering in "Processing XML Streams With Deterministic Automata and Stream Indexes", ACM Transactions on Database Systems, Vol. 29, No. 4, December 2004, pages 752-788. The authors of this paper propose to build the DFA "lazily." That is, they build an NFA as in YFilter and add states to the DFA only when needed. However, the DFA structure proposed by Green et al. would perform fastest if memory were of no consideration, since matching the XML document structure to the XPath queries is a simple path traversal, driven by arriving XML tags. However, even this "lazy DFA" proves to be very memory intensive. Thus, in some of the tests performed, the authors simply ran out of memory (2 GB), while YFilter could process the same amount of data with under 100 MB of memory.

Candan et al. propose an AFilter in "Adaptable XML filtering with Prefix-Caching and Suffix-Clustering", Proceedings of the 32nd VLDB Conference, 2006. The AFilter departs from the NFA/DFA schemes slightly, in that it uses two main structures called AxisView and StackBranch. AxisView is a graph used to represent the queries and StackBranch is used to represent the currently active tags of the XML document. The AxisView is simply a compressed DFA (Deterministic Finite Automaton) structure that only creates a single object (node) for each set of XML tags observed from set of XPath queries. In addition, the AxisView only puts edges between nodes from child/descendants to parents/ancestors within queries. Multiple labels are kept for each edge with information about query identification, depth, parent/ancestor relationship, and triggering state. The StackBranch is used to traverse the AxisView structure when a triggering event occurs (when a tag that matches the final location step of a XPath query is received).

Figure 1:
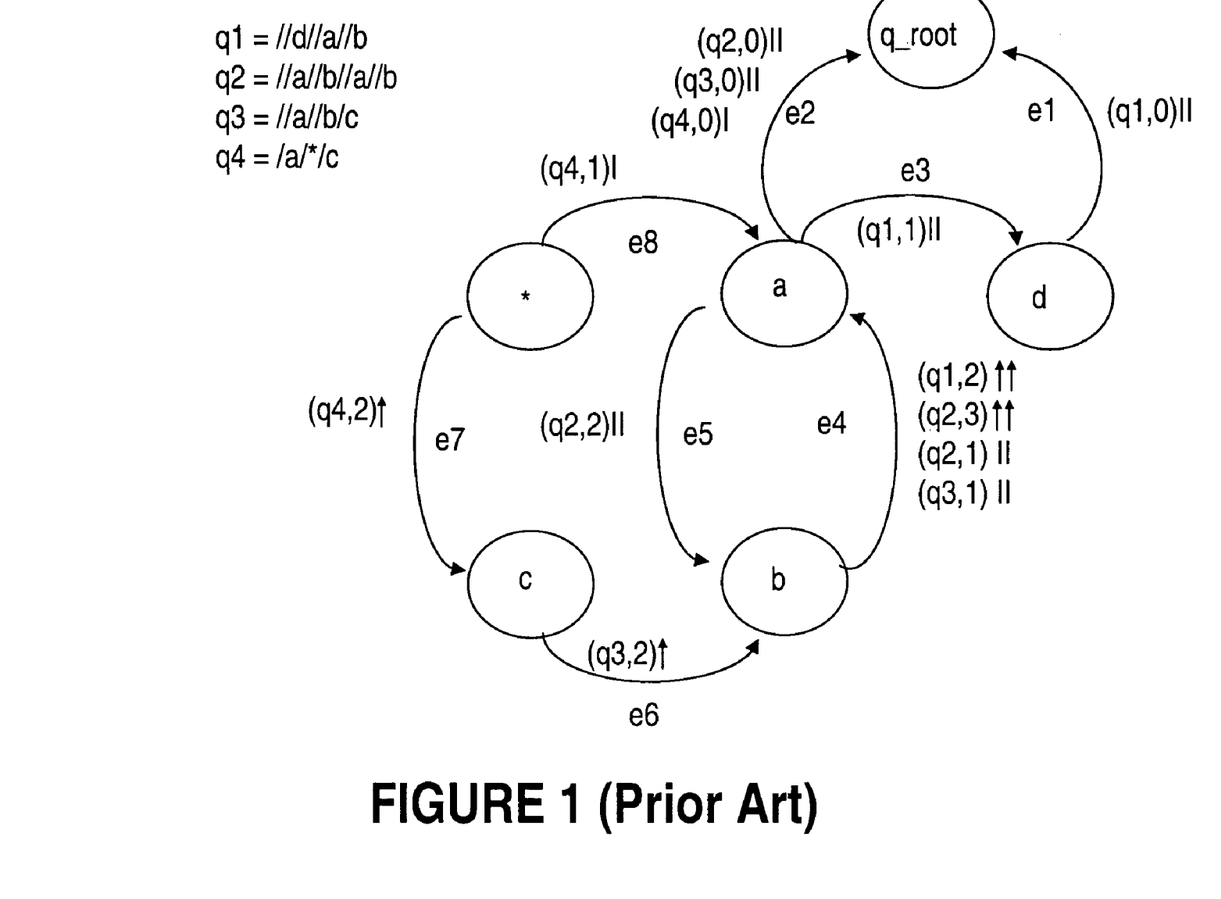
FIG. 1 illustrates an example of an AxisView graph representing some exemplary queries.
Figure 2A:
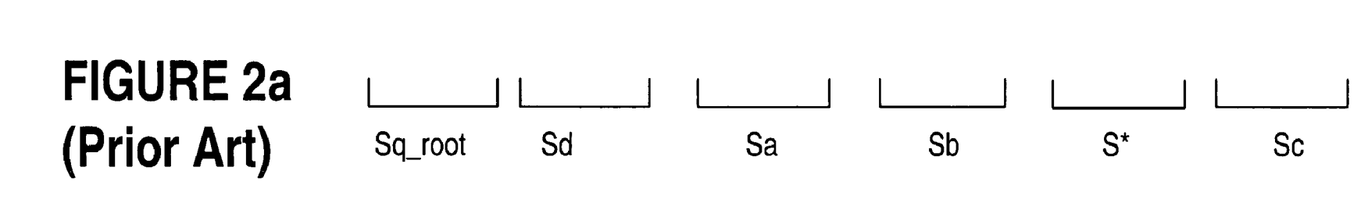
FIGS. 2a, 2b and 2c shows a runtime stack structure that uses StackBranch for representing the current active tags of an XML document queried using the graph of FIG. 1. Namely.
Figure 2B:
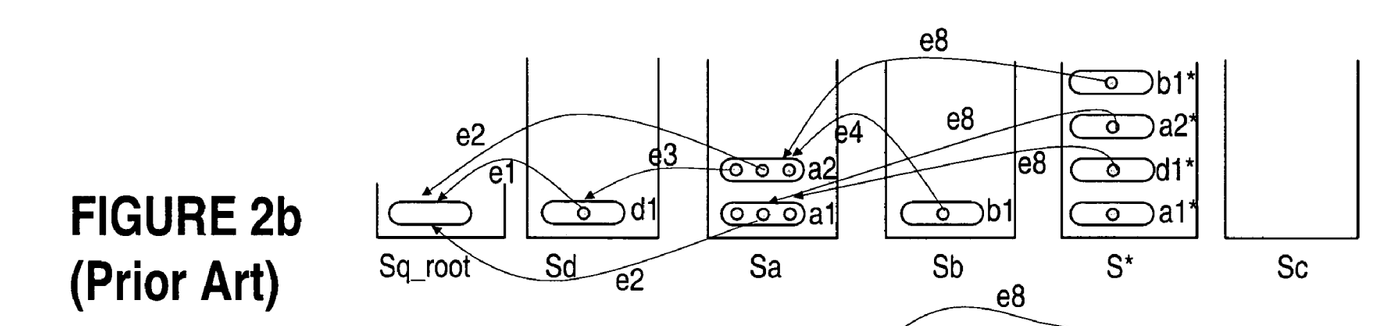
Figure 2C:
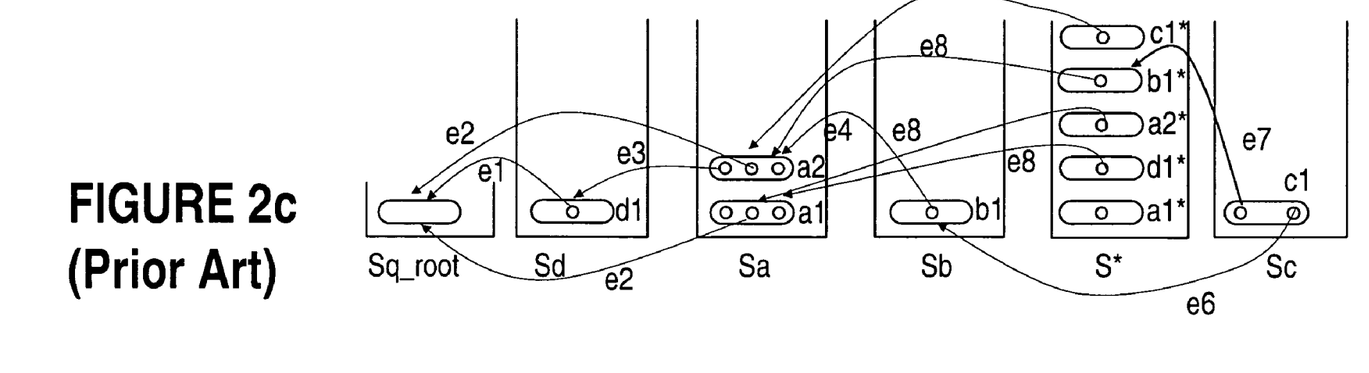

FIGS. 1 and 2a-2c show an example of how the AFilter performs the matching on the complex policies. FIG. 1 illustrates an AxisView graph for providing an example of the AFilter operation. FIGS. 2a-2c show how the StackBranch is used to traverse the AxisView structure when a triggering event occurs. In this specification, a triggering event is simply a tag that matches the final location step of a query. The AxisView structure shown in FIG. 1 is traversed in a bottom up manner (from the queries point of view) when a tag arrives that causes a triggering event; if no triggering events occur, the AxisView structure is never traversed.

As indicated above, AxisView is a graph used to represent the queries, the graph being constructed using a compressed DFA (Deterministic Finite Automaton) structure that creates a single object (node-set, Boolean, number, string) for each set of XML tags observed from sets of XPath queries. When a triggering event occurs, AFilter uses the runtime stack (StackBranch) to traverse the AxisView structure. As indicated above, a triggering event occurs when a tag that matches the final location step of a query is received.

The AxisView of this example illustrates the path expressions {q1=//d//a//b, q2=//a//b//a//b, q3=//a//b//c and, q4=/a/*/c}, where characters // or / are represented in the drawings by symbols ↑↑ or ↑ for final states of XPath queries, and II or I for intermediate query states. The StackBranch shows all active tags in this example, i.e. all tags of the current XML document path that have not been closed. The XML root tag is denoted with q_root, and there are four tags a-d and a wildcard "*" received from the document; the terms "node" and "tag" are used interchangeably throughout this specification. The edges between the nodes are denoted with e1-to e8.

The first query q1=//d//a//b is shown by edges e1 from node d to the root, e3 from node a to node d, and e4 from node b to a, in this order. The second query q2=//a//b//a//b is shown by edges e2 from node a to the root, edge e4 from node b to node a, edge e5 from node a to b and e4 from node b to node a, in this order. The third query q3=//a//b//c is shown by edges e2 (node a to the root node), e4 (node b to node a) and e6 (node c to node b). Finally, q4=/a/*/c is shown by edges e2 (node a to the root), e8 (node * to node a) and e7 (node c to node *).

The StackBranch maintains a stack for each possible XML tag observed in an XPath query. Each time a tag is received from the XML parser, a stack object is created for that element and the object is pushed on its corresponding stack. Also, for each edge in AxisView, the stack object points to the top object of the corresponding elements stack, if the stack is not empty. Since the axes "/" and "//" are indicated within the labels between nodes of the AxisView structure, only the wildcard, "*" needs to be handled. StackBranch has a special stack dedicated to the "*" element and as elements are pushed onto their own stacks, a stack object is also created and pushed onto the "*" stack with pointers to tops of the other stacks. As seen in FIG. 1, node "*" has edges to nodes a and c. The node in the "*" stack points to the tops of the "a" and "c" stacks in StackBranch of FIGS. 2b and 2c.

In the example illustrated here, the initial StackBranch structure is shown in FIG. 2a, where the empty stacks for each XML tag are denoted with Sq_root, Sd, Sa, Sb, S* and Sc.

FIG. 2b shows the StackBranch after the transitions <a><d><a><b>. (a, b, c, and d are tags/elements from the XML document being parsed). In this example, receipt of tag b is a triggering event, since it represents the final location step of queries q1 and q2. As seen, the stack Sq_root contains an object, and the bottom objects from stacks Sd and Sa point to the root object with the respective edges e1 and e2. Stacks Sd and Sb contain one object only, d1 and respectively b1, since these tags are received only once from the parser. Stack Sa contains two objects, a1 and a2, since tag a is received twice. FIG. 2b also shows how the tags are stacked in S* in the order they are received, which is a1, d1, a2, b1.

FIG. 2c shows the StackBranch after the transitions <a><d><a><b><c>. In this case, receipt of tag c is a triggering event, since it represents the final location step for queries q3 and q4. The stack Sc only contains one object, c1, since tag c is only received once. FIG. 2c shows the object c1* placed in the stack S* on top of the objects already placed in this stack after the transitions shown in FIG. 3b.

As seen above, currently available XML matching algorithms perform well within limited circumstances. AFilter performs well with complex queries and YFilter/DFA performs well with simple queries. The current invention achieves high performance by maintaining separate databases for simple and complex queries and performing the queries simultaneously on these databases.

Figure 3:
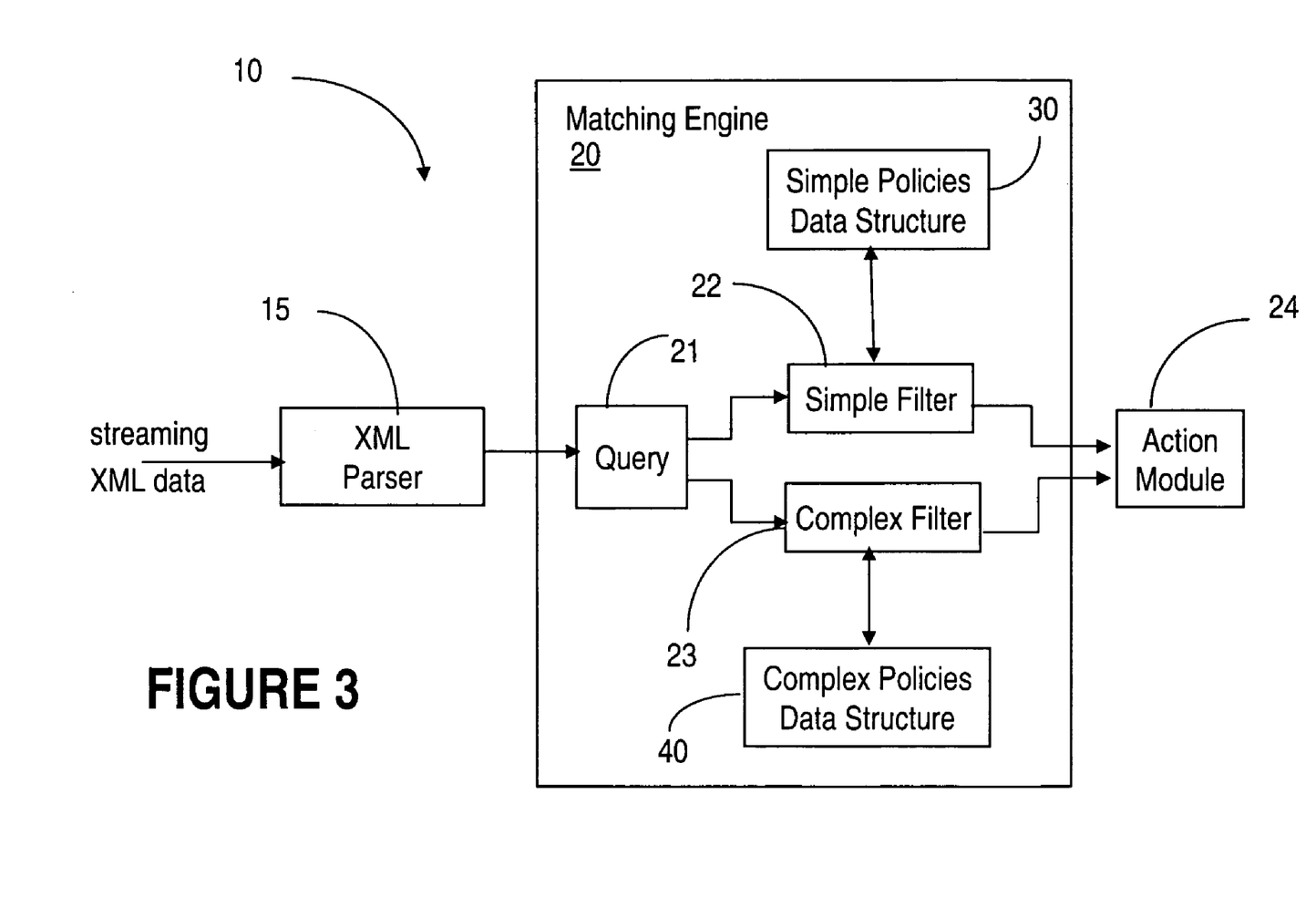
FIG. 3 is a block diagram of the XML policy matching system according to an embodiment of the invention.

FIG. 3 is a block diagram of the XML policy matching system 10 according to the invention. This Figure shows generically an XML parser 15 that receives the streaming XML data for a respective source and models the document as a tree of nodes using Xpath for enabling a matching engine 20 to navigate around the tree through the hierarchical structure of the respective XML document. An action module denoted with 24 performs the action corresponding to the policy found by the matching engine 20.

The XML policy matching system 10 according to this invention uses simultaneously two data structures, namely:

a simple policy lookup data structure 30 for storing simple XPath queries that do not use wildcard "*" and descendent "//" expressions; and a complex policy lookup data structure 40 for storing complex queries (with "*" or "//").

Each database is queried using a different type of filter. Namely, the simple policies database 30 is filtered using a simple filter denoted here with 22. The simple filter 22 could be, for example, based on a modified DFA (Deterministic Finite Automaton) structure. The complex policies database 40 is filtered using a complex filter 23, which could be designed by improving the YFilter/DFA structures and modifying the AFilter wildcard and descendent structures. As the system 10 receives XML tags from XML parser, the matching engine 20 uses a query module 21 to simultaneously query the two policies data structures 30 and 40 for matching the data received from the XML processor to the policies. The query module 21 may, for example, use the XQuery language.

The simple policy data structure (or module) 30 stores the simple policies, which are queried using simpler (and faster) filtering mechanisms, while the complex policy data structure (or module) 40 stores the complex policies, whose syntax includes wildcards such as "*" and "//" expressions. The policies are input into these data structures manually, or automatically, as case may be. By performing the queries simultaneously on the two data structures, the matching of queries to policies is performed much faster than with the existing methods described above.

If a policy corresponding to the XML data is identified in the simple policy module 30 and the corresponding action is identified in this module, the XML data is processed accordingly by the action module 24. At this point, the parallel search performed by the complex filter 23 is terminated. Similarly, if a policy corresponding to the XML data is identified in the complex policy data structure 40, the corresponding action is identified in module 40 and the XML data is processed accordingly by the action module 24. At this point, the parallel search performed by the simple filter 22 is terminated.

The structure of filters 22 and 23 in one of the preferred embodiments of the invention are described next. It is to be noted that other types of filters may be used for the simple and complex queries, and that the modified DFA, and the changes to YFilter and AFilter structures are discussed here by way of example only.

Simple DFA Structure

As indicated above, simpler XPath queries, ones without wildcards or descendents, are stored in a simple policy database 30. Similar to YFilter and DFA papers identified above, these filters can exploit commonalities among the XPath expressions. However, filter 22 used for matching engine 20 according to the invention merges the common prefixes of the XPath query paths and therefore the queries are only processed once. Since this is a DFA structure, at most one edge/transition is traversed in the DFA for each tag processed in the XML document. Furthermore, the instant a transition cannot be made to a state associated with a received tag (a non-existing state) further matches along the current document path are not possible and the incoming tag event processing in the DFA can be ignored until a current states end tag is received.

An example of simple XPath queries is shown in Table 1.

Q1: /a/b/d
Q2: /a/c/e
Q3: /a/d/e
Q4: /a/d/c
Q5: /a/b/e/f
Q6: /a/b/d
Q7: /a/d/c/e
Q8: /a/b/d/c
Q9: /a/d
Q10: /a/c/d/e

Figure 4:
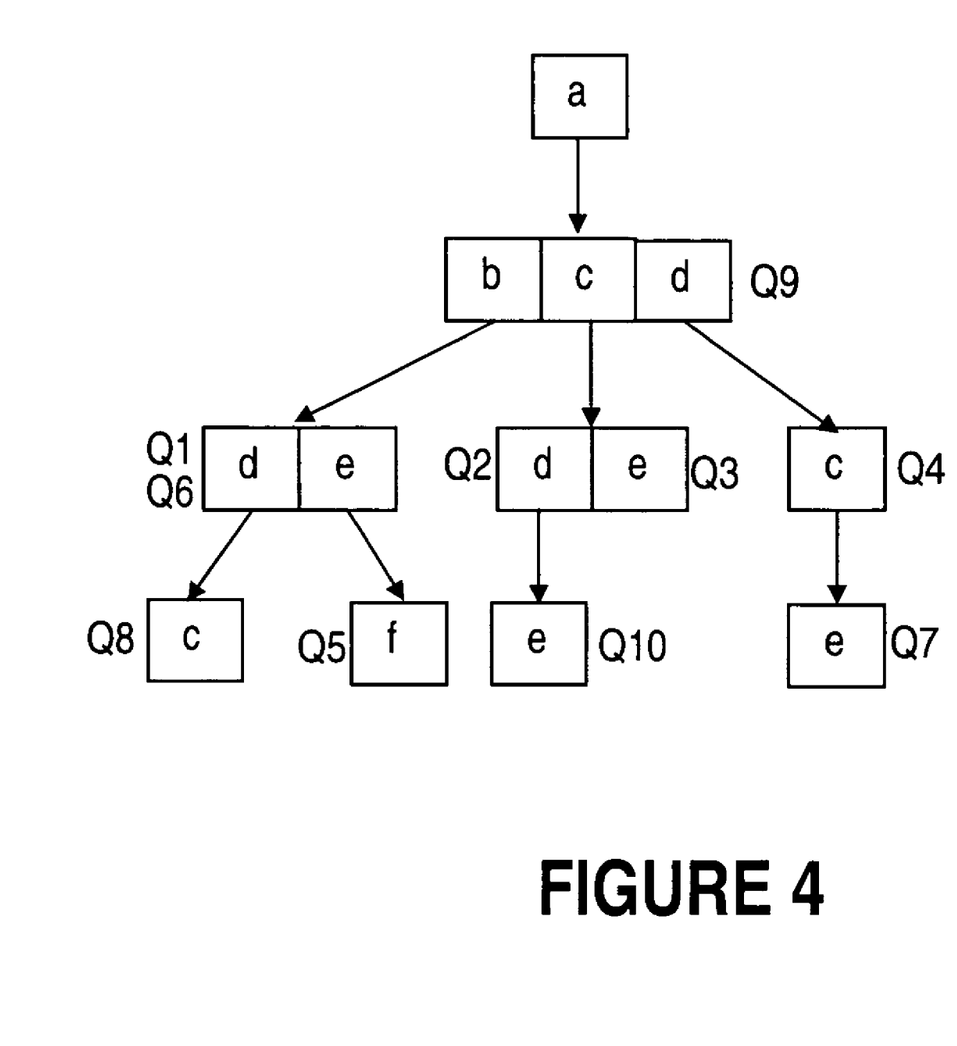
FIG. 4 is an example of Deterministic Finite Automation Automata Automaton (DFA) structure according to the invention.

The above queries are stored in a structure as shown in the example of FIG. 4. As tag a appears in all queries, it is placed at the top of the structure. At the second level, tags b, c, and d are merged since they are common to all queries in various combinations, and thus they are only processed once. At the next level, tags d and e are merged so that the combination de is processed only once. Thus, tags a and b appear with tags d in Q1 (see the left-most branch) and appear with tag e in Q5; and tags a and c appear with tag d in Q2, and with tag e in Q3. As tags a and d appear with tag c only in queries Q4 and Q7, there is no combination possible along the right-most branch. The next level includes the remaining tags for the queries Q8, Q5, Q10 and Q7, which again are not merged. Merging the common prefixes of the XPath queries results in a reduction in structure memory, since prefixes of overlapping queries are only stored once. This arrangement also provides an improved processing time since multiple queries are advanced through their state machines simultaneously.

Complex Queries

The queries that include wildcards "*" or descendents "//" are performed on the complex policies data structure 40. In the current YFilter/DFA structure, the location step elements may appear in several locations throughout the structure, as seen in the example of FIG. 1. In order to further speed-up the query process and to better use the memory space, a modified AFilter structure may be used according to the invention for storing the complex queries; nonetheless, other types of structures are also possible. The modification resides in the fact that the complex query structure according to the invention merges the location step elements to save storage space.

Use of a modified AFilter structure is preferred over use of a DFA mechanism since the current AFilter structures allow to simply check if the current tag to be processed from the XML document is the final, triggering state (location step) of an XPath query, before trying to traverse the set of query states in search of an XML document structural match. If an XML document does not contain a triggering state, the AxisView "reverse-state-machine" will never be traversed.

Currently StackBranch structure used for the AFilter defines one stack for each AxisView node, including a special stack for the wildcard element "*", as seen in FIGS. 2a-2c. This seems wasteful as the number of nodes in the AxisView structure could be very large, while the amount of elements across all StackBranch stacks will only ever be at most the depth of the XML document. The present invention proposes to implement StackBranch with a single stack for all nodes of the AxisView in addition to a "*" stack, denoted with S*. This can be accomplished with little additional structure.

Figures 5A, 5B:
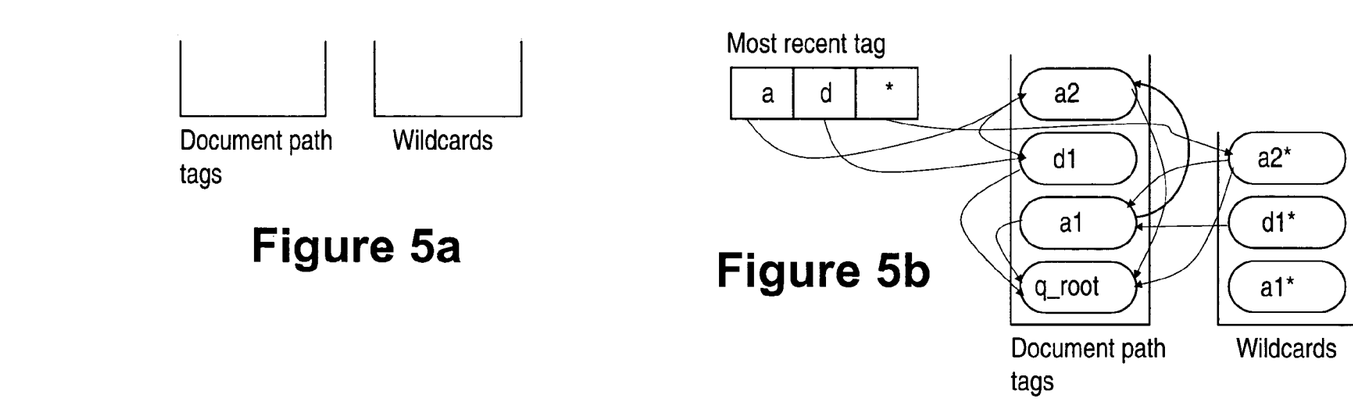
FIGS. 5a, 5b and 5c show an example of the runtime stack structure according to the invention for representing the current active XML tags in the same XML document queried in FIGS. 2a to 2c. Namely.
Figure 5C:
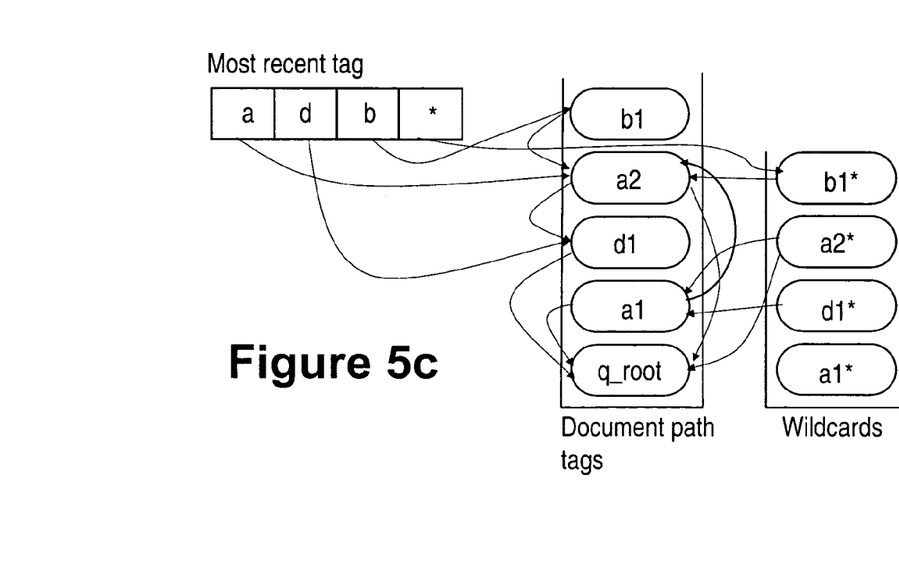

FIGS. 5a to 5c are a representation of the current active tags of the example shown in FIGS. 2a-2c. Here, FIG. 5a shows the stacks before receipt of any tags, FIG. 5b illustrates the after receipt of the set of tags <a><d><a>, and FIG. 2c shows the stacks after receipt of the set of tags <a><d><a><b>.

As shown in FIG. 5a and indicated above, only two stacks are maintained, S* for stacking the wildcards "*" and one for all the document path tags.

To reiterate, it is to be understood that other types of filters may be used to store simple and complex queries; the fact that according to the invention the simple and complex queries are stored separately enables performing searches simultaneously on both data structures, which speeds-up significantly the query runtime, and results in memory space savings.

As seen above, the invention provides important advantages over the existing solutions described above. Namely, it preserves the ability of matching all queries with a single pass through XML Document. Also, since screening of non-matching documents is performed upfront, traversing states of queries is delayed. The speed of the matching process is also increased since XML parsing events trigger/drive the matching process. Still another feature that enables speeding the matching process is enabled by the use of the modified AFilter process, where runtime memory use is proportional to the depth of document. In this invention the size of the runtime stack is reduced, thus avoiding the YFilter non-determinism.

The invention is also memory efficient in that it avoids exponential memory consumption to handle complex queries. In addition, the policy matching according to the invention uses combined storage for states with identical names with a view to further save memory space. A more efficient use of the memory as compared to the current matching engines is that it uses a combined range-based structure for predicate value matching.

We claim:

1. A method of enforcing application-layer policies to application layer formatted documents, each policy defining a rule and an action, comprising:
   distinctly storing simple policies and complex policies applicable to the application layer formatted documents in a simple policies data structure, wherein said simple policies data structure stores XPath queries that do not use wildcard "*" and descendent "//" expressions, and, respectively, a complex policies data structure, wherein said complex policies data structure stores XPath queries that use wildcard "*" and descendent "//" expressions;
   parsing a document received as streaming application layer data in a hierarchical structure, for enabling evaluation of an object in the document, wherein the document is an Extensible Markup Language (XML) document and the object is a result of evaluation of an XPath expression;
   simultaneously querying the simple and complex policies data structures to identify all policies corresponding to the object;
   discontinuing the query for the object in the simple and complex policies data structures once all of the simple and complex policies that match the object are identified; and
   executing the actions defined by the simple and complex policies corresponding to the object.

2. The method of claim 1, wherein the simple data structure is filtered by a Deterministic Finite Automaton (DFA) structure.

3. The method of claim 1, wherein querying the simple data structure is performed using a Deterministic Finite Automaton (DFA) structure, where two or more XPath queries that have a common prefix are merged.

4. The method of claim 1, wherein the complex policies data structure is filtered by a compressed Deterministic Finite Automaton (DFA) structure for representing the query, and a stack structure for representing currently active tags of the XML document, the stack structure being used for traversing the DFA structure on receipt of a tag in the document that matches a final location step of the query.

5. The method of claim 4, wherein the stack structure uses a single stack for all tags received from the document and a second stack for the wildcard "*".

6. The method of claim 1, wherein the simple policies data structure is a simple policies database.

7. The method of claim 1, wherein the complex policies data structure is a complex policies database.

8. The method of claim 1, wherein the simultaneously querying involves use of an XQuery language in a query module.

9. The method of claim 1, wherein the simultaneously querying terminates once a policy matching the XML document is found in either the simple policies data structure or the complex policies data structure.

10. The method of claim 1, wherein prefixes of overlapping queries are only stored once in the simple policies data structure.

11. A system for enforcing application-layer policies to documents, each policy defining a rule and an action, comprising:
   a XML parser for parsing a XML document received as streaming XML data in a hierarchical structure to enable evaluation of an object in the XML document;
   a simple policies data structure for storing XPath queries that do not use wildcard "*" and descendent "//" expressions;
   a complex policies data structure for storing XPath queries that use wildcard "*" and descendent "//" expressions;
   means for simultaneously querying the simple and complex policies data structures to identify all policies corresponding to the object; and
   means for executing the actions defined by the policies corresponding to the object identified in the data structures.

12. The system of claim 11, wherein the simple policies data structure is filtered by a Deterministic Finite Automaton (DFA) structure.

13. The system of claim 11, wherein querying the simple policies data structure is performed using a Deterministic Finite Automaton (DFA) structure, where two or more XPath queries that have a common prefix are merged.

14. The system of claim 11, wherein the complex policies data structure is filtered by a compressed Deterministic Finite Automaton (DFA) structure for representing the query, and a stack structure for representing currently active tags of the XML document, the stack structure being used for traversing the DFA structure on receipt of a tag in the document that matches a final location step of the query.

15. The system of claim 14, wherein the stack structure uses a single stack for all tags received from the document and a second stack for the wildcard "*".

16. The system of claim 11, wherein the simple policies data structure is a simple policies database.

17. The system of claim 11, wherein the complex policies data structure is a complex policies database.

18. The system of claim 11, wherein the simultaneously querying involves use of an XQuery language in a query module.

19. The system of claim 11, wherein the simultaneously querying terminates once a policy matching the XML document is found in either the simple policies data structure or the complex policies data structure.

20. The system of claim 11, wherein prefixes of overlapping queries are only stored once in the simple policies data structure.

* * * * *

UNITED STATES PATENT AND TRADEMARK OFFICE
CERTIFICATE OF CORRECTION

PATENT NO. : 7,668,802 B2
APPLICATION NO. : 11/878981
DATED : February 23, 2010
INVENTOR(S) : Bashar Said Bou-Diab and Paul Boone It is certified that error appears in the above-identified patent and that said Letters Patent is hereby corrected as shown below:

Col. 9, Claim 11, line 2, before "documents," please insert --Extensible Markup Language (XML)--

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,668,802 B2 |
| APPLICATION NO. | : 11/878981 |
| DATED | : February 23, 2010 |
| INVENTOR(S) | : Bashar Said Bou-Diab and Paul Boone |

Page 1 of 1

It is certified that error appears in the above-identified patent and that said Letters Patent is hereby corrected as shown below:

Col. 9, Claim 11, line 34, before "documents," please insert --Extensible Markup Language (XML)--

This certificate supersedes the Certificate of Correction issued March 30, 2010.

Signed and Sealed this

Twenty-seventh Day of April, 2010

David J. Kappos
*Director of the United States Patent and Trademark Office*